L. WEINMAR.
APPARATUS FOR PRESERVING BEER, &c.
No. 169,934. Patented Nov. 16, 1875.
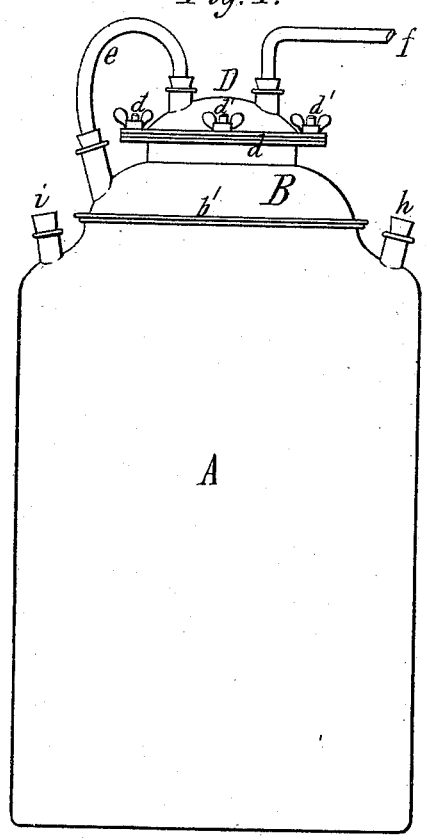
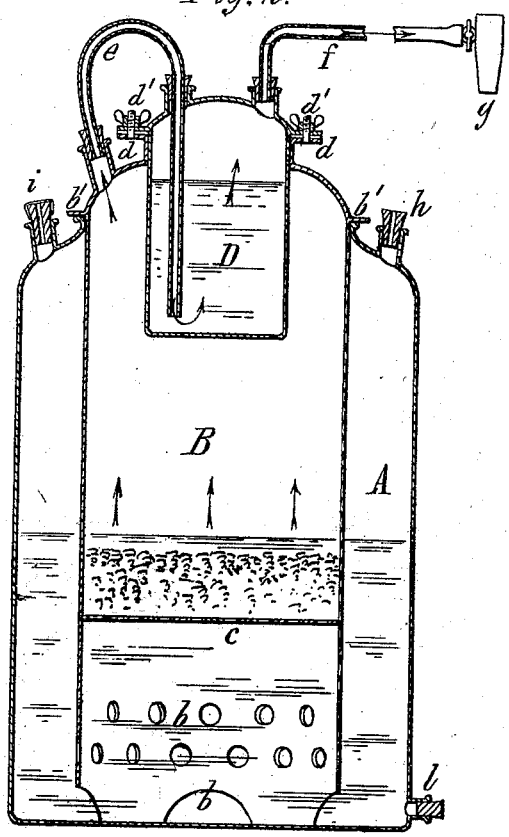
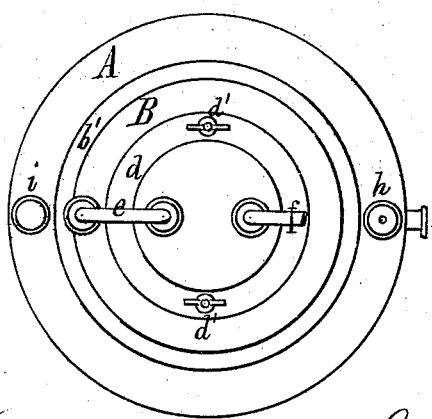
Witnesses: Edward Wilhelm, C. J. Buchheit
Louis Weinmar, Inventor
by Jay Hyatt, Atty

UNITED STATES PATENT OFFICE.

LOUIS WEINMAR, OF BUFFALO, NEW YORK.

IMPROVEMENT IN APPARATUS FOR PRESERVING BEER, &c.

Specification forming part of Letters Patent No. 169,934, dated November 16, 1875; application filed October 12, 1875.

*To all whom it may concern:*

Be it known that I, LOUIS WEINMAR, of the city of Buffalo, in the county of Erie and State of New York, have invented certain new and useful Improvements in Apparatus for Preserving Beer, Ale, and similar liquids, which improvements are fully set forth in the following specification, reference being had to the accompanying drawings.

My invention relates to an apparatus for charging beer, ale, and similar liquids with carbonic-acid gas, so as to prevent the same from becoming stale and unpalatable by the escape of the gas originally contained in such liquids.

My invention consists in the peculiar construction of the apparatus, so as to be cheap and compact, and, at the same time, self-regulating, and capable of being readily taken apart when required to be charged or cleaned, as will be fully understood from the following description.

In the accompanying drawing, Figure 1 is a side elevation, Fig. 2 a vertical section, and Fig. 3 a top plan view, of my improved apparatus.

Like letters of reference refer to like parts in each of the figures.

A is the cylindrical outer vessel or acid-reservoir, and B the inner generating-vessel arranged concentrically in the vessel A. The vessel B is made open at the bottom and closed at the top, and provided near its bottom with perforations $b$, and near its top with an annular flange or rim, $b'$, by means of which it rests upon the top of the outer vessel A. The vessel B is of less diameter than the vessel A, and fits snugly in the opening in the top of the latter, but so as to be readily inserted and removed therefrom. $c$ is a perforated diaphragm or bottom arranged in the inner vessel B at about one-third of its height from the bottom or lower end of the vessel. D is the washing or purifying chamber arranged in the upper portion of the vessel B, to which it is tightly secured by flanges $d$ and screw-bolts $d'$. The upper portion of the vessel B is connected with the vessel D by a bent pipe, $e$, diving into the vessel D, and terminating at a short distance from the bottom thereof. $f$ is the gas-discharge pipe, constructed of rubber or other flexible material, and connecting the top of the washing-vessel with the bent $g$ or other part to be driven into the cask containing the malt liquor. $h$ and $i$ represent two vents arranged in the upper portion of the outer vessel A, one for admitting air into the same, and the other to permit the escape of the air therefrom. The washing-vessel D is charged with water, or, preferably, a solution of bicarbonate of soda, and the generating-vessel with a suitable quantity of marble dust or chips placed upon the perforated diaphragm $c$, when the washing-vessel D is secured to the generating-vessel B by means of the screw-bolts $d'$. The outer vessel A is charged with muriatic acid, so that the level of the acid will rise above the marble-dust in the generating-vessel when the latter is inserted in the vessel A.

Upon placing the vessel B, charged as above described, into the vessel A, the acid comes in contact with the marble-dust and generates carbonic-acid gas, which accumulates in the vessel B, and passes thence through the pipe $e$ to the washing-vessel D, where it rises through the liquid contained therein, and escapes by the pipe $f$. When no beer is drawn from the cask, nor any gas absorbed by the beer, the gas accumulates in the vessel B and gradually expels the muriatic acid from the vessel B through the perforations $b$, so as to withdraw the acid from the marble-dust, whereby the generation of gas is stopped until an escape for the accumulated gas is provided by drawing beer from the cask or by the gradual absorption of the gas by the beer, when the acid will again rise in the vessel B to its former level, and the generation of gas recommence. When the muriatic acid is expelled from the vessel B, as above described, it rises in the outer vessel A, expelling the air therefrom through the vent $i$, while, when the acid is permitted to rise in the vessel B, the outer air enters the vessel A through the vent $h$.

It will be seen from the foregoing that the outer vessel A is practically open at the top, as the vents $h$ and $i$ permit the free ingress and escape of the air to and from the vessel A. The function of the vents $h$ and $i$ is to prevent the muriatic acid contained in the vessel A from exhaling the objectionable fumes which it would if the vessel A was partially or entirely uncovered.

$l$ is an opening formed in the lower portion of the vessel A for withdrawing the acid therefrom when required.

My improved apparatus is very compact and cheap of construction, can be readily taken apart for charging and cleaning the same, and is perfectly automatic in its operation, requiring no attention except in charging it from time to time.

I claim as my invention—

1. The combination, with the open outer acid-vessel A, of the inner removable generating-vessel B and washing-vessel D, connected with the latter, substantially as and for the purpose hereinbefore set forth.

2. The combination, with the open acid-vessel A, of the inner generating-vessel B, provided with perforations $b$ and perforated diaphragm $c$, washing-vessel D, and connecting depending pipe $e$, substantially as and for the purpose hereinbefore set forth.

3. The combination, with the acid-vessel A, generating-vessel B, and washing-vessel D, of the air-admitting vent $h$ and air-escape vent $i$, arranged in the acid-vessel, substantially as and for the purpose hereinbefore set forth.

LOUIS WEINMAR.

Witnesses:
EDWARD WILHELM,
C. J. BUCHHEIT.